May 1, 1951          J. M. ROSHONG          2,551,568
GRINDER FOR THE SPHERICAL ENDS OF ROLLERS
Filed Dec. 29, 1947          4 Sheets-Sheet 1

INVENTOR:
Joseph M. Roshong,
by Can Kerr Gravely,
HIS ATTORNEYS.

May 1, 1951 J. M. ROSHONG 2,551,568
GRINDER FOR THE SPHERICAL ENDS OF ROLLERS
Filed Dec. 29, 1947 4 Sheets-Sheet 2

INVENTOR:
Joseph M. Roshong
by Carleen & Gravely
HIS ATTORNEYS.

May 1, 1951 J. M. ROSHONG 2,551,568
GRINDER FOR THE SPHERICAL ENDS OF ROLLERS
Filed Dec. 29, 1947 4 Sheets-Sheet 3

INVENTOR:
Joseph M. Roshong,
by Cam Kerr K Gravely,
HIS ATTORNEYS.

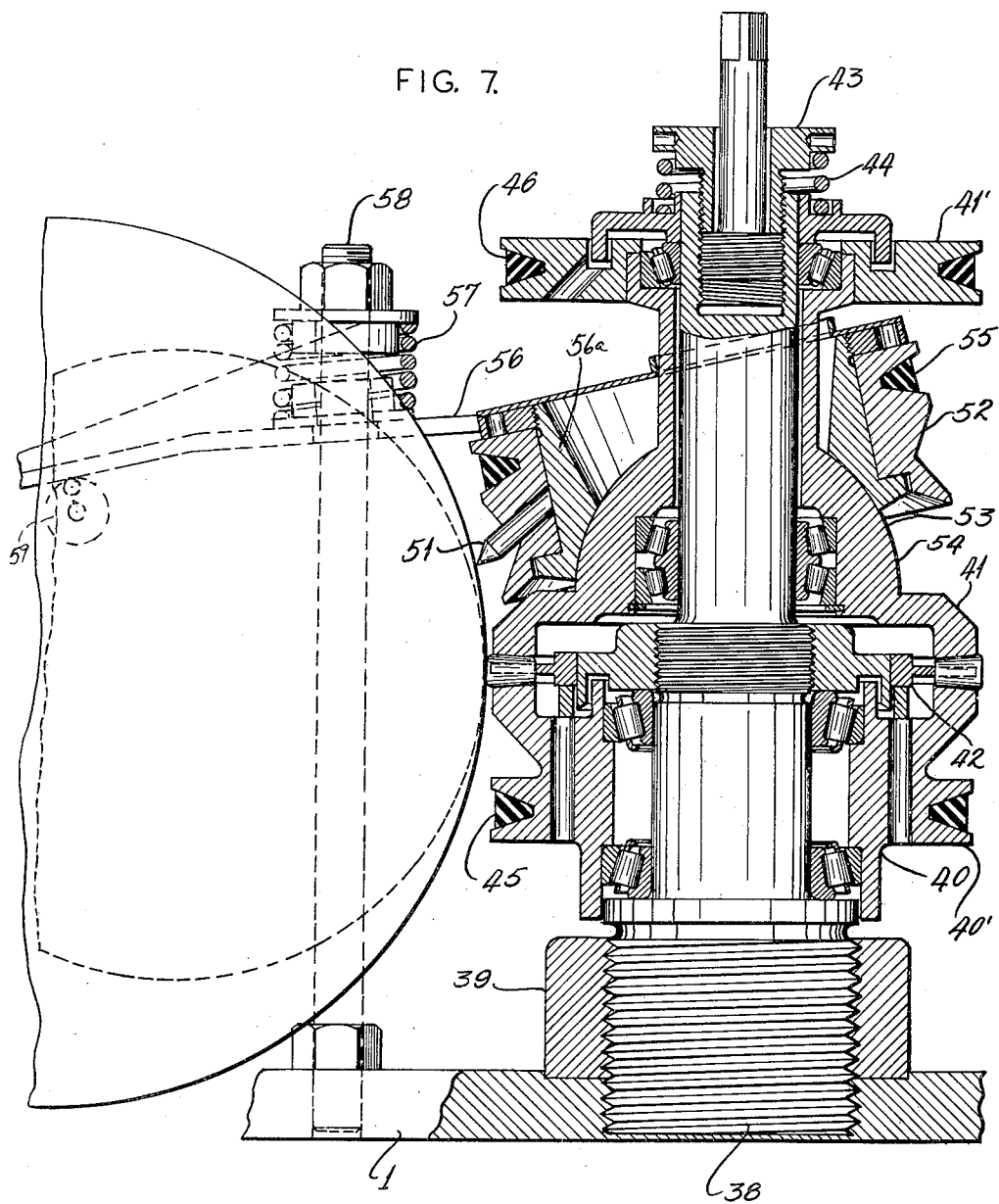

Patented May 1, 1951

2,551,568

UNITED STATES PATENT OFFICE 2,551,568

GRINDER FOR THE SPHERICAL ENDS OF ROLLERS

Joseph M. Roshong, Canton, Ohio, assignor to The Timken Roller Bearing Company, Canton, Ohio, a corporation of Ohio Application December 29, 1947, Serial No. 794,378

7 Claims. (Cl. 51—236)

This invention relates to machine tools and in its more specific aspects is directed to a machine for grinding or otherwise working the spherically-shaped ends of work pieces such as the tapered rollers of anti-friction roller bearings.

One of the objects of the invention is to provide an automatically-operated machine tool for controlling and maintaining a required spherical radius on the ends of a work piece and to have said ends ground true or square with respect to the longitudinal axis of the work piece with a high degree of accuracy.

Another object of the invention is to provide a machine tool provided with a means for automatically maintaining the correct contour on the surface of the grinding wheel which consists of a dresser that is so located as to accurately dress the grinding wheel relative to the work piece carrier and which will additionally provide a definite lead-in which will uniformly distribute the grinding action over the full operatng width of the grinding wheel.

A further object of the invention is to provide a work holder for the work pieces that will rotate and retain them in proper position relative to the grinding wheel surface and to discharge them from the machine tool after the grinding operation is completed.

In the drawings:

Fig. 7 is a vertical sectional view of the device illustrated in Fig. 6.

Figure 1:
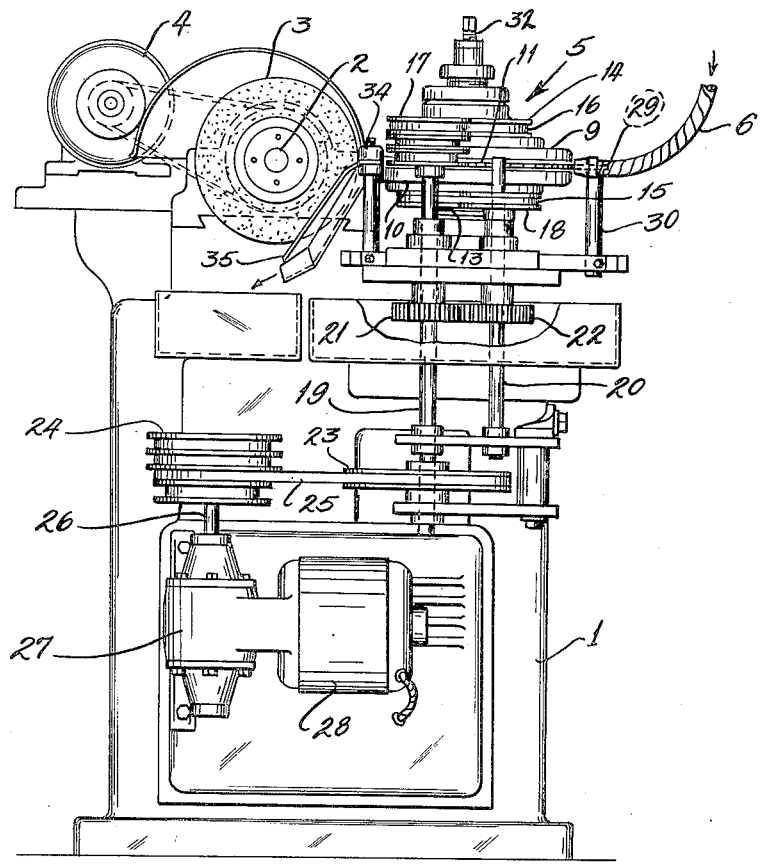
Fig. 1 is a front elevational view of the grinding machine.

Referring now to the drawings, numeral 1 designates generally the frame of a grinding machine which is provided with a grinder spindle 2 upon which a suitably constructed grinding wheel 3 is mounted driven by a suitable prime mover 4 such as an electric motor. The grinding wheel is capable of being moved in two directions with respect to the machine frame 1 in suitable ways well-known to the art so as to properly position it with respect to the work holder and rotating member generally designated by the numeral 5. The work pieces which are specifically in the form of tapered rollers are introduced into a tube 6 leading from a suitable feeding device (not shown) for the purpose of introducing the work pieces continuously into the work holding and rotating device.

The work holding and rotating device 5 consists of a central spindle member 7 which is threaded into the machine frame 1 in which it is securely held in position by means of a locknut assembly 8 on member 7. The work holding member further consists of two members 9 and 10 rotatably mounted on the spindle, there being suitable anti-friction bearings provided so as to make the two members more easily rotatable on the spindle member 7. Freely rotatable between the members 9 and 10 is a work receiving plate 11 that is supported on member 10 by supports 11' and is provided with a plurality of slots 12 into which slots the work pieces are fed through the tube 6. The center line of plate 11 is coaxial with the center line of the tapered work pieces. The members 9 and 10 are provided with pulleys 13 and 14, respectively, appropriately secured thereto, which are driven by belts 15 and 16, respectively, that lead around pulleys 17 and 18, respectively, secured to shafts 19 and 20, respectively. These two shafts are geared together by means of gears 21 and 22 so that the members 9 and 10 may be rotated in opposite directions. The shafts 19 and 20 are disposed in suitable bearings supported in the machine frame and one of the shafts is provided with a pulley 23 driven from the pulley 24 by means of the belt 25. The pulley 24 is mounted on a shaft 26 that is the output side of the speed reducing member 27 driven by an electric motor or other prime mover 28. It is thus seen that the members 9 and 10 will, therefore, be rotated in opposite directions to thereby impose rotational movement on each of the work pieces as it is introduced into the space between the members 9 and 10 and in one of the slots 12. The upper member 9 and driving pulley 17 are adjustable for variable pitch, to increase or decrease the rate of rotation of the upper member in order to pass the work across the grinding surface in the desired direction and at a desired rate. To impart motion to the plate 11 in a counter-clockwise direction as is employed in this machine, the lower member 10 is rotated counter-clockwise and the upper member assembly is rotated clockwise with the lower member rotated slightly faster than the upper disc assembly, the rate of movement of the work across the grinding surface being half the difference of the rates of rotation of members 9 and 10 and in the same direction as the member rotated at the higher rate. The surfaces of members 9 and 10 that contact the work pieces are tapered so that the rollers will snugly fit therebetween and when held in position will freely rotate.

Means have been provided to prevent the rollers or work pieces from working out of the holder and to properly space them from the center of rotation of members 9 and 10 which consists of a ring 29 secured to a standard 30, said ring extending around the device to a point adjacent the grinding wheel, the object thereof being to retain the work pieces in the slots 12 in the plate 11 and between members 9 and 10. The members 9 and 10 are urged toward each other in a resilient manner by means of a spring 31 whose tension is adjusted by means of a screw 32 so that the proper degree of frictional engagement is maintained between the members 9 and 10 and the work pieces.

The contour of the guard ring surrounding the loaded portion of the discs is such that the work pieces are retained with proper spacing from the center of rotation to create a balancing load zone opposite the grinding zone of the discs. The same guard ring also provides a low pressure or loose zone between the load balancing zone and the grinding zone and opposite the empty zone of the discs to facilitate the unloading and loading of the work pieces from and into the space between the discs. The guard ring also eases the work pieces into grinding wheel contact.

At the completion of the grinding operation, the work pieces are ejected from plate 11 by means of a mechanism 33 that is bolted to a machine frame 1 by means of a suitable screw 34. The member 33 extends into the space between members 9 and 10 and as the work pieces pass the grinding wheel 3, they engage member 33 and are forced out of the slots 12, then fall into the chute 35 in order to be collected in a suitable container.

It is thus seen that as the work pieces are introduced between the members 9 and 10 they will be rotated while being held in position between the members and because of the properly shaped or contoured grinding wheel 3, the desired spherical formation will be cut on the work pieces.

The grinding wheel has a portion thereof so constituted that the trailing surface or that portion of the wheel which last contacts the work piece is formed of a particular material that dresses well or better than any other portion of the wheel so as to cause a more perfect alignment of the said portion with the work pieces so that upon leaving that portion of the wheel they will not skew or go out of alignment and thereby eliminate any undesirable marking of the ground ends of the rollers.

Figure 2:
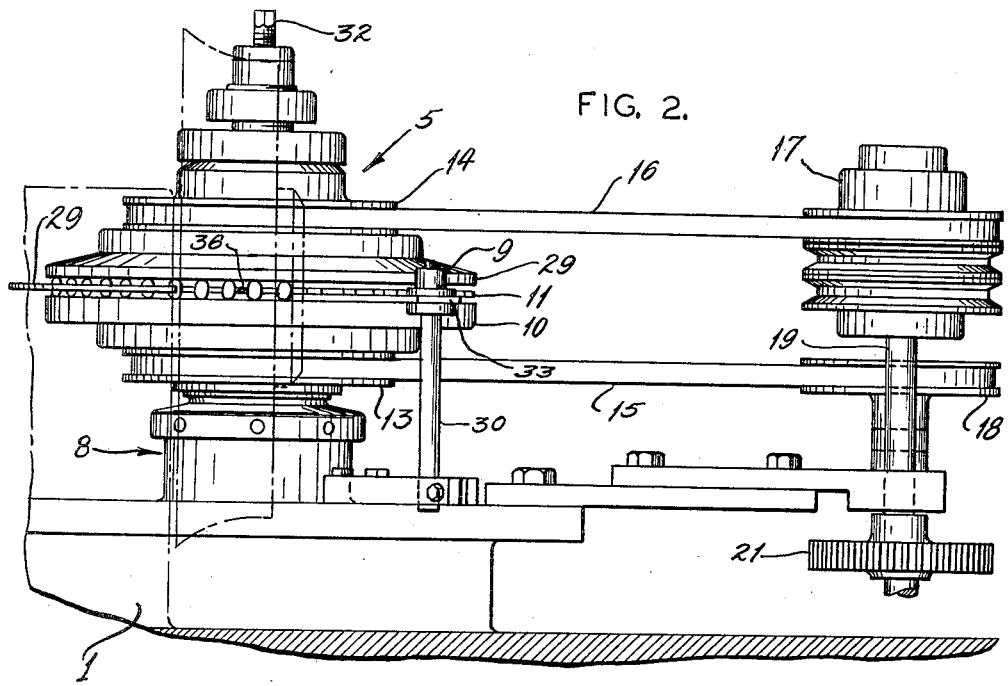
Fig. 2 is an enlarged elevational view of the work holding and rotating device.

Provision is made for dressing the grinding wheel 3 by means of a diamond pointed dressing tool 36 mounted in plate 11 and particularly shown in Fig. 2 which periodically engages the grinding wheel 3 and, therefore, provides said wheel with its desired contour so that the ends of the work pieces will be properly ground. The plate 11 must be slowly rotated in order to accomplish the desired dressing.

Figure 4:
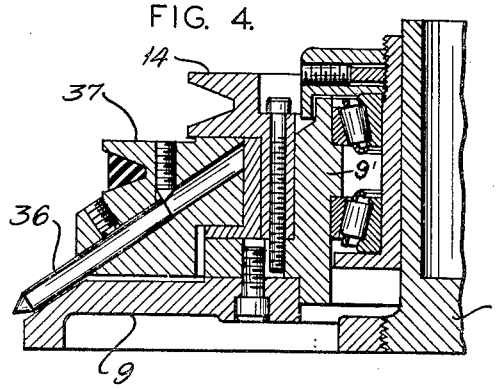
Fig. 4 is a partial sectional view of the grinding wheel dressing fixture.

A modified form of wheel dresser is shown in Fig. 4. This form of dresser greatly improves the action of the dressing tool 36. The member 9 has the same general shape at its periphery as described above but it is supported on a sleeve-like member 9' in which suitable bearings are fitted so that it may rotate about spindle 7. The pulley 14 is suitably secured to the sleeve 9' and thereby to the member 9. The tool dresser holder 37 is mounted on the member 9 about a suitable bearing and may be rotated relative thereto. A V pulley is formed in the holder 37 and may be independently driven by a belt which may be connected to one of the V pulleys in the pulley generally indicated at 17. The dressing tool 36 is adjustably mounted in the holder 37 and engages the wheel somewhat above a horizontal plane passing through the spindle 2. This positions the point of the tool a desired height above the center line of the grinding wheel 3 relative to the center of the work holding and supporting member. In so dressing the wheel relative to the work holding and supporting member, a definite lead-in is produced on the grinding surface which distributes the grinding action over the width of the grinding wheel.

Figure 6:
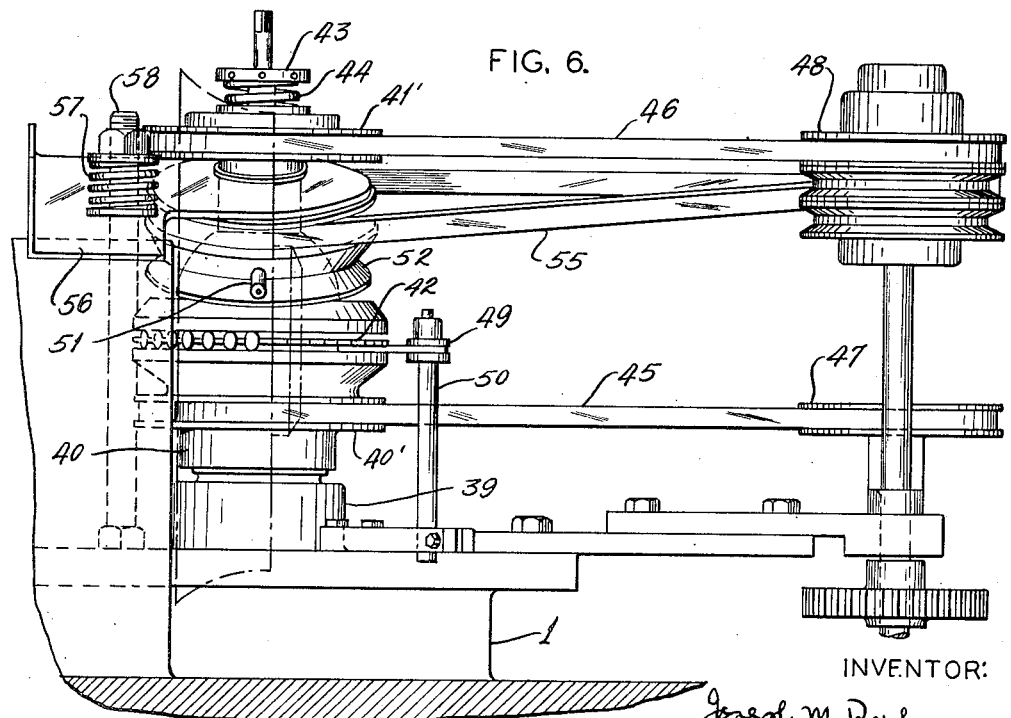
Fig. 6 is an elevational view of a modified form of the work holding and rotating means.
Figure 3:
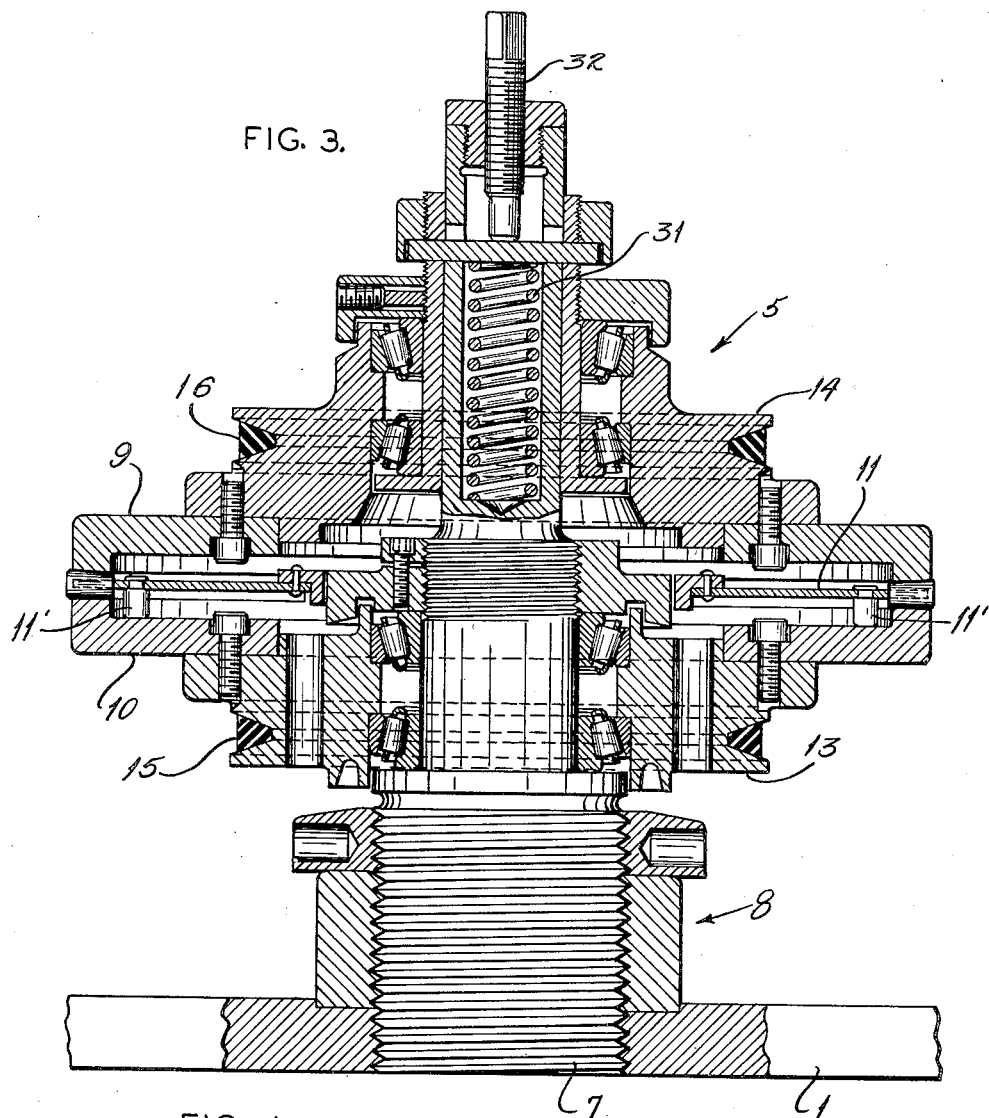
Fig. 3 is a vertical sectional view of the work holding and rotating device.

A modified form of the work holder is illustrated in Figs. 6 and 7 which is provided with a spindle 38 threaded to the machine frame 1 and is locked in a vertically adjusted position by a lock nut 39. Rotatably mounted on the lower portion of the spindle 38 is a one-piece combination pulley and work rotating device 40 suitably journaled thereon as by means of anti-friction bearings. Rotatably disposed above the member 40 is another combination pulley and work rotating member 41 likewise suitably journaled on the spindle by anti-friction bearings and between the members 40 and 41 but rotatable relative thereto is a peripherally slotted plate 42 which is similarly supported on member 40 as is the plate 11 described above. Rotation is imparted to plate 42 by driving members 40 and 41, plate 42 rotating in the direction of the faster driven of the members. Work pieces are fed to the device and positioned in the slots formed in the member 42 and are kept in frictional engagement with suitable tapered surfaces formed on the periphery of the adjacent surfaces of members 40 and 41 and a predetermined pressure is maintained between the work pieces and said members by means of an adjusting device comprising a screw 43 and a spring 44 disposed at the upper end of the spindle 38 in which the greater the compression of spring 44, the greater will be the frictional engagement between the two members.

Members 40 and 41 are rotated in opposite directions and at different rates of speed by means of pulleys 40' and 41' that are formed on each member about which belts 45 and 46, respectively, are threaded and which also thread about pulleys 47 and 48, respectively, which are the same as pulleys 18 and 17 described above. The shafts on which these pulleys are arranged are rotated in opposite directions in order that the members 40 and 41 may be rotated in opposite directions to thereby rotate the work pieces. Pulleys 48 are variable in size so that the relative rates of rotation of members 40 and 41 may be maintained. The rollers are maintained in position between members 40 and 41 by retaining means 49 secured to standard 50 which is mounted on the machine frame 1. The function of this device is identical with the corresponding structure described in connection with Fig. 2 above.

Figure 5:
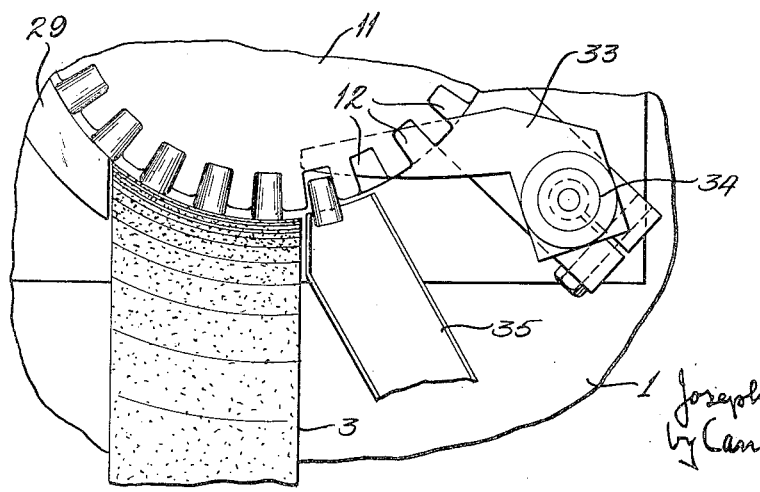
Fig. 5 shows a plan view of the work piece ejecting means.

Ejecting means similar to that illustrated in Fig. 5 may be provided for this work holder and following completion of the grinding operation, the work pieces are discharged into a suitable trough such as 35 illustrated in Fig. 5.

The wheel dressing tool 51 is secured in a combination pulley and holder 52 which is provided with a spherically shaped surface 53. The member 41 has a spherical surface 54 thereon that cooperates with the complementary spherical surface 53 formed on the holder 52 in the manner illustrated. The holder 52 is rotated by means of a belt 55 received in the pulley formed thereon and is threaded around a pulley constituting one of the series of pulleys 48 so that it is rotated in the same direction as the member 41 but not necessarily at the same rate of speed.

The point above center at which the tip of the dressing tool comes into contact with the grinding surface is determined by a cam follower member 56, one end of which is attached to the non-rotating member 56a and its other is yieldably urged against an adjustable cam 59 by a spring 57 disposed upon a stud 58. The position of tool 51 is controlled by the cam follower member 56 riding on the adjustable cam 59 located above the wheel axis.

What I claim is:

1. A device for holding work pieces adjacent a grinding wheel comprising a first disc provided with a peripheral flange; a second disc provided with a peripheral flange, the peripheral flanges on each disc being suitably shaped so as to receive a work piece therebetween; a plate rotatable relative to said discs provided with a plurality of peripheral slots in which work pieces are received while they are engaged by the peripheral flanges; means to rotate said discs in opposite directions in order to rotate said plate and said work pieces as they are presented to the grinding wheel; means secured to said peripherally slotted plate to dress the grinding wheel; means to position and retain the work pieces in said slots between said peripheral flanges; and means to resiliently urge the peripheral flanges into engagement with the work piece in said slots.

2. A device for holding work pieces adjacent a grinding wheel comprising a first disc provided with a peripheral flange; a second disc provided with a peripheral flange, the peripheral flanges on each disc being suitably spaced so as to receive a work piece therebetween; a plate rotatable relative to said discs provided with a plurality of peripheral slots in which work pieces are received while they are engaged by the peripheral flanges; means to rotate said discs in opposite directions at different speeds in order to rotate said plate and said work pieces as they are presented to the grinding wheel; means to retain the work pieces in position in said slots between said peripheral flanges; means for resiliently urging said discs toward each other and a dressing tool adjustably mounted on one of said discs and so disposed as to dress the grinding wheel so that it will contour the grinding wheel with a predetermined lead-in.

3. A device for holding work pieces adjacent a grinding wheel comprising a first disc; a second disc; the peripheral portions of each disc being suitably shaped so as to receive a work piece therebetween; a plate rotatable relative to said discs provided with a plurality of peripheral slots in which work pieces are received while they are engaged by the peripheral portions of said discs; means to rotate said discs in opposite directions in order to rotate said work pieces as they are presented to the grinding wheel; means to position and retain the work pieces in said slots between said peripheral portions; a dressing tool supported on one of said discs; and means to vary the position of the point of application of the dressing tool to the grinding wheel.

4. A device for holding work pieces adjacent a grinding wheel comprising a first disc provided with a peripheral flange; a second disc provided with a peripheral flange, the peripheral flanges on each disc being suitably shaped so as to receive a work piece therebetween; a plate rotatable relative to said discs provided with a plurality of peripheral slots in which work pieces are received while they are engaged by the peripheral flanges; means to rotate said discs in opposite directions at different speeds in order to rotate said plate and said work pieces as they are presented to the grinding wheel; means to retain and position the work pieces in said slots between said peripheral flanges; a dressing tool supported on one of said discs; means to vary the angle at which the dressing tool is applied to the grinding wheel; and means to rotate said dressing tool relatively to the disc on which it is supported.

5. A device for holding work pieces adjacent a grinding wheel comprising a first disc provided with a peripheral flange; a second disc provided with a peripheral flange, the peripheral flanges on each disc being suitably shaped so as to receive a work piece therebetween; a plate rotatable relative to said discs provided with a plurality of peripheral slots in which work pieces are received while they are engaged by the peripheral flanges; means to rotate said discs in opposite directions at different speeds in order to rotate said plate and said work pieces as they are presented to the grinding wheel; means to retain the work pieces in position in said slots between said peripheral flanges; a spherical member formed on one of said discs; a dressing tool holder provided with a spherical socket and fitted over said spherical member; and means to rotate said dressing tool holder.

6. A device for holding work pieces adjacent a grinding wheel comprising a first disc provided with a peripheral flange; a second disc provided with a peripheral flange, the peripheral flanges on each disc being suitably shaped so as to receive a work piece therebetween; a plate rotatable relative to said discs provided with a plurality of peripheral slots in which work pieces are received while they are engaged by the peripheral flanges; means to rotate said discs in opposite directions at different speeds in order to rotate said plate and said work pieces as they are presented to the grinding wheel; means to position and retain the work pieces in said slots between said peripheral flanges; a spherical member formed on one of said discs; a dressing tool holder provided with a spherical socket and fitted over said spherical member; resiliently supported means engageable with said dressing tool holder to vary the height of the point of application of the dressing tool with the grinding wheel to contour it with a predetermined lead-in; and means to rotate said dressing tool holder.

7. A device for holding a work piece adjacent a grinding wheel comprising a peripherally flanged first disc; a peripherally flanged second disc, the adjacent surfaces of the flanges being so shaped as to snugly receive a work piece therebetween; means to rotate each of said discs in opposite directions and at different rates of speed; means to support a dressing tool on one of said discs; means to rotate said last mentioned means at the same or a different speed than the disc on which it is mounted; a work receiving plate rotatable relative to said discs and disposed between said discs and provide with a plurality of slots in which work pieces are disposed while received between said discs, the speed of rotation of said plate varying as the difference in speed of said discs varies; means for resiliently urging said discs toward each other and means to retain the work pieces in position in said plate between said discs.

JOSEPH M. ROSHONG.

REFERENCES CITED

The following references are of record in the file of this patent:

UNITED STATES PATENTS

| Number | Name | Date |
| --- | --- | --- |
| 2,024,118 | Vanderbeek | Dec. 10, 1935 |
| 2,434,245 | Johnson | Jan. 13, 1948 |
| 2,482,485 | Hutchinson | Sept. 20, 1949 |